Patented Apr. 29, 1941

2,240,365

UNITED STATES PATENT OFFICE 2,240,365

METHOD OF TREATING TALL OIL

Emil Edward Dreger, Summit, N. J., assignor to Colgate-Palmolive-Peet Company, Jersey City, N. J., a corporation of Delaware No Drawing. Application July 11, 1939, Serial No. 283,861

11 Claims. (Cl. 260—97.5)

This invention relates to the production of valuable organic materials, detergents, and like agents, as well as products adapted for use in the production of such agents, in commercially satisfactory form, from crude products obtained as by-products in the processing of wood and the like for the production of paper. The invention includes not only the new process of producing the improved materials, but also the improved detergents and products adapted for the production of these materials.

When wood is hydrolyzed to obtain pure cellulose by alkaline or acid processes, the materials that are associated with the cellulose in the wood may be separated in a readily recoverable form and in some instances are industrially recovered. It appears reasonable that they will be obtained industrially from all commercial procesess for recovery of cellulose from wood. In the alkaline processes for the production of paper from wood, that is, the "sulphate" and "soda" processes, a by-product is obtained which is variously referred to as tall oil, liquid resin, etc., in acid form; and as crude resin soap, sulphate rosin, sulphate soft soap, crude floating soap, etc., in saponified form. In producing wood pulp by the sulphate process, for example, the cellulose portions of the wood are obtained by digesting the wood with a solution of sodium hydroxide and sodium sulphide, with separation from the cellulosic portion of various organic products, including resins, fatty acids, ligneous material, phytosterols, phenolic bodies, oxygenated and sulphur containing bodies, tar, pitch, etc., the treating chemicals and the water as a product being commonly termed "black liquor." This black liquor is subsequently treated to recover the soda which it contains by evaporating the water and smelting the resulting product. During such recovery, there separates from the black liquor the product referred to above, which mainly consists of the sodium salts of resin-like acids and the sodium salts of fatty acids, together with a considerable proportion of unsaponifiable material. It is dark in color and has an extremely objectionable odor. It may be treated with dilute solutions of acids or acid gases, such as sulphuric acid and sulphur dioxide, to liberate the resin-like acids and the fatty acids, in which case the product commonly referred to as liquid resin or tall oil is obtained. This product consists of a mixture of resin-like acids, fatty acids and unsaponifiable material, all more or less complex in nature, is dark in color, and has an objectionable odor.

Many proposals have been made to prepare soaps from this liquid resin, but, so far as I am aware, none of the processes proposed have resulted in the production of a satisfactory product. Because the physical properties, such as boiling range, of several of the tall oil ingredients are so similar, it has not been possible satisfactorily to separate these ingredients by direct means. Furthermore, it is known that anhydrous sodium resinates cannot be melted when heated as high as 350° C., and previous attempts to heat them to such temperatures ordinarily resulted in burnt products due to local overheating. Hence, it was not generally believed that any treatments of the liquid resin soaps involving temperatures of this order would prove operative. Soaps prepared from the liquid resin by previously proposed processes, including distillation processes, extraction processes, etc., have in general been too soft, have contained too high a proportion of unsaponifiable material, and have had an objectionable odor. Because of these properties of the soaps heretofore produced, their field of use has been strictly limited.

The present invention provides a process for the production of relatively pure uniform organic materials, including commercially satisfactory soaps, from liquid resin or its soaps, whether crude liquid resin or distilled liquid resin or crude liquid resin purified by solvent or alkali brine extraction or by other methods. It is possible to prepare relatively pure fatty acids, resin acids, and wood sterols by the present process, which individual constituents may be used for various purposes, alone or in admixture. The fatty acids, with or without additional treatments, are preferably converted to soaps, with or without the resin acids present in the original mixture. These soaps are free from objectionable odor, are substantially harder than comparable products obtained by previously proposed processes and contain but a very small proportion of unsaponifiable material, and those prepared from the fatty acids alone are substantially white in color.

The unsaponifiable material is separated from the resin-like acids and fatty acids, or their saponification products, in a form having important advantages for the production of sulphonated or phosphated detergents by treatment with oleum, chlorsulphonic acid or other sulphonating agents, or with phosphoric acids. This treatment may also advantageously be carried out in a solvent such as liquid sulphur dioxide, carbon tetrachloride, hydrocarbons, and the like, or mixtures thereof. The unsaponifiable materials thus separated apparently have different characteristics from unsaponifiable materials separated by extraction or the like, which may result from their being modified by the process to which the raw material is subjected. The soaps produced and the separated unsaponifiables are new products having important advantages over products previously prepared from corresponding raw materials and hence may be used for purposes for which the prior art products would not be suitable.

Liquid resin obtained as a by-product from the alkaline processes for the production of paper pulp contains, depending upon the history of the material, roughly from about 30 to 60% of fatty acids, from about 60 to 30% of resin-like acids, and about 8 to 20% of unsaponifiable material, including hydroxylated material, hydrocarbon material, etc. The following table indicates the major composition of two tall oil products, as now available on the market:

|  | I | II |
| --- | --- | --- |
|  | Percent | Percent |
| Fatty acids | 36 | 60 |
| Resin acids | 54 | 32 |
| Unsaponifiable material | 10 | 8 |

The composition of the various constituents is very complex, and the exact chemical structure thereof is not known. The proportions of the various constituents may vary more or less widely, depending upon the source, the particular method of treatment of the wood to produce the paper pulp, etc. The product as obtained directly from the black liquor is in saponified form, that is, the fatty acids and resin-like acids exist as sodium salts; and both this product and the acid product obtained by treating the saponified product with an acid, such as sulphuric acid, are very dark in color and have a very objectionable odor. The dark color which develops in the tall oil has been found to be due in part to the presence of phenolic bodies in the oil or soap. The freshly prepared soap is especially sensitive to air oxidation, with consequent blackening; hence, the name of "black liquor" is applied to it. This coloration is partly due to the well known ease with which polyhydric phenols oxidize in an alkaline or neutral form. Distillation of the acidified product, that is, the liquid resin, temporarily improves the color but it does not eliminate the objectionable odor nor does it separate the unsaponifiable material. This material is objectionable in a soap, because the boiling range of the unsaponifiable material extends over the whole boiling range of the fatty acids and the resin-acids.

It has further been found that tall oil may be fractionally distilled by means of a suitable column and that the fatty acids are substantially separated from the resin acids by this treatment, which is described in greater detail hereinafter.

In accordance with the present invention, the liquid resin, with or without pretreatment, is subjected, after or during saponification, to a properly regulated heat treatment. This heat treatment is conducted at relatively high temperatures, while passing a strong current of steam or inert gas through the liquid resin, advantageously under reduced pressure, in the substantial absence of air and liquid water. This treatment removes the unsaponifiable material from the saponified mass and apparently radically changes the characteristics of both the saponified and the unsaponified material with marked improvement in them. The treatment may be carried out at various temperatures, preferably ranging from about 200° C. to about 350° C. In this temperature range, the substantially anhydrous liquid resin soap is in a freely fluid form, such that the steam which is passed through it thoroughly agitates it. This insures uniformity of temperature throughout the mass and prevents any portions of the mass, for example, those portions in contact with the walls of the vessel, from being overheated and subjected to decomposition. The strong current of steam which is used serves not only to agitate the liquid mass, but also to assist in the vaporization of the unsaponifiable materials which are distilled off, as well as to blanket the mass and to exclude air, thus preventing oxidation at the high temperatures used.

This treatment radically changes the character of the saponified product. The product obtained is free from objectionable odor and is substantially free from unsaponifiable material. It forms a harder soap when grained, and the acids which may be liberated from it have a considerably lower iodine number, indicating either a change in the position of the unsaturated groups (i. e. stability) or a greater degree of saturation. If the liquid resin originally treated is a previously distilled and/or otherwise purified product, the saponified product obtained by the process of this invention is light in color, as the process causes little or no darkening, if carried out under proper conditions.

That the process can be successfully applied to liquid resin or its saponified product is unexpected, because ordinary resin, when treated in the same manner, does not liquefy. Ordinary resin usually decomposes as a result of local overheating.

The unsaponifiable material, which is vaporized from the saponified mass and condensed in a suitable condenser, is also different in character from unsaponifiables which may be separated from liquid resin or the like by extraction processes. The unsaponifiable material obtained contains hydroxylated bodies, as well as hydrocarbon and other complex bodies. Approximately 40 to 50% of the product reacts with chlorsulphonic acid or oleum, as when in solution in a solvent comprising liquid sulphur dioxide, to form sulphonated or sulphated bodies. Approximately 5 to 10% of the bodies which react with the acid form sulphated bodies, the remainder forming sulphonated bodies. The acetyl number of the unsaponifiables obtained in accordance with the present process is considerably higher than the acetyl number of the unsaponifiables separated from corresponding material by extraction processes, indicating that the unsaponifiable product of the present invention has a greater content of hydroxylated bodies, or, in any event, that is more reactive with acetic anhydride than is the extracted unsaponifiable material. This is an unexpected result, because treatment of hydroxylated bodies at high temperatures ordinarily tends to remove the hydroxyl groups with the formation of unsaturated bodies.

It is also a feature of the present invention, in preparing purer products, to treat the tall oil soaps thinned with water with a current of air, with or without steam and/or other gases, and then to contact this material with a strong alkaline sodium chloride brine. It is advantageous to treat the thinned soap with the air in an alkaline condition and/or in the presence of added inorganic salts. Discoloration of the fatty acids is prevented by having them in the form of alkaline soaps, and the inorganic bases and salts serve to open the soap in order to facilitate passage of the air and other gases therethrough. The blowing may be combined with a graining operation by treating the tall oil soaps with a strong alkaline brine, while stirring well with a current of air, with or without steam or other gases. The operation is conducted preferably shortly after the crude soap is removed from the black liquor. The soap is salted out of the mixture by this treatment, and sodium phenates and lignin-like materials remain in the brine solution. In order to insure more complete separation, the hot mixture is permitted to stand. The brine solution is removed from the soap, which is then thinned with water and again salted out of solution. The procedure may be repeated to obtain more thorough removal of the phenolic bodies and the lignin-like bodies. The brine wash step may be conducted on the soaps at any point in the process. The soaps are acidified, for example with sulphuric acid, and lignin materials may be removed by filtration or centrifuging if the above brine wash has been omitted. For economy of operation, fractional distillation of the tall oil acids may be conducted at this point.

Although it is not essential, it is also possible to dissolve the tall oil in gasoline for the purpose of separating out the gasoline-insoluble resinous matter. The latter may be removed by decantation and/or filtration. The gasoline solution may then be further extracted by furfural or similar solvent to remove additional viscous, resinous and color bodies. The tall oil in the form of an alkaline soap solution may also be treated, preferably at a boiling temperature, with air or other oxidizing agent to decrease the solubility of the coloring and like matter in the gasoline. The soap may be grained from solution to separate phenolic bodies, acidified, washed, and gasoline-extracted as above.

The tall oil soaps may be bleached with chlorine or hypochlorite at any time during the treatment of the tall oil in order to improve the final products.

If a crude, dark, undistilled product is treated, it may be desirable, after the alkali-steam treatment, to split the soap and distill the acids to improve their color. If a light-colored raw material is used, such distillation after treatment is not generally necessary, and the anhydrous soaps produced may simply be hydrated and used as such or in admixture with other soaps, or otherwise treated.

However, it is often desired that the tall oil be substantially separated into its constituents, thus recovering the fatty acids, the resin acids, and the sterol-like bodies in individual fractions. These materials, so separated, are far more valuable and have greater utility than the various mixtures thereof. The separated fatty acids can be used for preparing high grade soap or even edible products. The rosin acids can be used in resin, adhesive and coating compositions as well as for laundry soaps. The sterol-like bodies can be used in preparing various synthetic chemical compositions. For example, they may be used as wetting agents and detergents in the form of the salts of their sulphuric and phosphoric acid derivatives.

The separation of the ingredients is best effected by fractional distillation. The acids obtained from the tall oil soaps are treated in the anhydrous state at an elevated temperature in the presence of steam for the purpose of first removing the non-saponifiable materials, substantially consisting of sterol-like bodies. The absence of the non-saponifiables, which have a very broad boiling range, renders the separation of the fatty acids by distillation more efficient. The material, however, may be fractionally distilled at any point before the above outlined high temperature alkali-steam treatment in order to separate the acidic constituents into fatty acids and resin acids, followed by the novel treatment of the soaps thereof to separate the non-saponifiables, or the process may include fractional distillation of the acids and their fractions before and after the heat treatment of the soaps of said acids.

The material may also be fractionated by fractional crystallization from acetone or similar solvents. The removal of non-saponifiables here again improves the process to an unexpected degree. Larger fractions, of more uniform material, are obtained by crystallization of the acids of the alkali-steam treated material than by crystallizing material not so treated. The fractions may be recrystallized several times to obtain the optimum separation. The absence of the unsaponifiables from the tall oil is particularly valuable for recovery of rosin therefrom. Rosin will separate from a kerosene solution of tall oil free from unsaponifiables more readily and in a better condition than from a solution of tall oil not so treated.

The fractional distillation may be carried out by any standard procedure and is preferably conducted by taking the soap product from the high temperature alkali-steam treatment, acidifying to obtain the organic acids, and washing the acids free from soluble extraneous matter. The dried washed acids are then ready for fractionation, which is advantageously carried out by first rapidly heating the material in a suitable heater, such as a pipe still. The temperature of the heater is preferably controlled, so as to raise the temperature of the acids as they pass therethrough to substantially 250° to 300° C. as rapidly as possible within several minutes. The temperature and pressure are dependent, to a large extent, upon the nature of the acids of the particular liquid resin being treated. Steam, preferably superheated, may be added to the acids during the heating process in order to assist in the subsequent vaporization. Thermal decomposition is substantially prevented by application of the heat by means of a pipe still for only the short period required to reach the fractionation temperature.

The acid vapors issuing from the heater at a temperature of about 250° to 300° C. pass into a flash chamber, preferably at a reduced pressure of about 5–10 mm. In this apparatus, the unvolatilized portion, mainly resinous material, is separated from the volatilized portion and drops to the bottom of the flash chamber. Steam superheated to the heater outlet temperature is passed into the bottom of the flash chamber for stripping purposes. If desired, a number of plates may be included below the heater vapor outlet, in order more effectively to strip the bottoms of resinous materials. The resin acid materials may be withdrawn from the bottom of the flash chamber. Baffles are placed at the top of the flash chamber to remove entrained unvaporized materials from the fatty acid vapors.

A number of fractionating systems are possible, but a series of individual fractionating columns is preferred because the boiling points of some of the fatty acids that are desired to be separated lie very close together, and it has been found that this distillation scheme is preferable to the use of only one tower containing many bubble plates. The number of columns required is equal to the number of cuts desired less one.

Thus, the vapors issuing from the flash chamber are passed into a bubble plate column supplied with superheated bottom stripping steam. In this column, bottoms are removed, and an overhead cut is removed. Reflux is supplied by means of a partial condenser located at the top of the column. The cooling medium for this condenser may be changing stock which is already raised in temperature by passage through the partial condensers connected to the succeeding columns which are operated at successively lower temperatures. In this manner the overall thermal efficiency may be greatly increased.

The stripped bottoms discharged from this column are considered resin acids and are free from the mixture of fatty acids comprising the overhead from this column.

In the succeeding column, the now resin-free mixture of fatty acids is separated. By proper control of the individual reflux ratios and bottom steam ratio, taking also into consideration the effectiveness of the column, it is possible to cut the mixture of fatty acids into very narrow boiling fractions.

A high vacuum may be maintained on the entire system by any suitable means, as, for example, a steam jet.

An alternate procedure is to separate the mixture by passing the vapors issuing from the flash chamber into a bubble plate fractionating tower. The fatty acid vapors entering the fractionating tower, which maintains a suitable reflux, may be separated by reason of their different boiling points into relatively pure fractions of fatty acids. The hot liquid acids may be drawn from various plates in the tower which contain the largest percentage of individual fatty acids and are passed into individual reboilers. Steam superheated to the proper temperature is passed into the bottom of the reboiler, where the feed is stripped of the more volatile portions, which vapors are returned to the column. The liquid withdrawn from the stripper may be a fairly pure fatty acid, e. g. palmitic acid, but it generally will be found to contain a certain amount of other fatty acids. A more complete separation, of course, may be obtained upon further fractionation. If desired, portions of certain of these fractions may be returned to the feed to raise the vapor pressure of the original mixture.

The liquid drawn from the bottom of this fractionating column consists primarily of relatively pure resin acids. In order to facilitate fractionation, a current of steam is passed into the column from an open steam coil positioned in the bottom of the fractionating column.

From the upper bubble plate of the fractionating column, the vapors, consisting principally of steam and a fatty acid, pass through a reflux condenser, which furnishes sufficient reflux for the desired fractionation. The non-condensed vapors pass through a line into a vapor condenser wherein the temperature is so regulated that practically all of the fatty acid vapors are liquefied and the steam is left in the vapor state. The fatty acid liquefied in the condenser is substantially pure. Any fatty acids in the steam are removed by passing the steam around suitable baffles, whereby the particles of fatty acid are removed. The steam, freed from its suspended fatty acids, is preferably passed directly to a barometric condenser, to which are connected suitable vacuum pumps which serve to maintain the entire system under a suitable reduced pressure.

Although this description is directed to the fractional distillation of the acids freed from the non-saponifiable sterol-like material, the invention is not so limited, and the fractional distillation may be similarly applied to the tall oil before the steam treatment of the soaps of tall oil or before and after such treatment. It is also possible, in order to effect separation of the resin acids from the fatty acids, to esterify the fatty acids in the presence of inorganic acids, such as sulphuric acid or hydrochloric acid, with one or more alcohols, such as methyl alcohol, ethyl alcohol, glycerol and butyl alcohols. The esters of the fatty acids differ appreciably in physical properties from the rosin acids and, hence, may be more readily separated therefrom than the original fatty acids. The separation is preferably by distillation, with or without additional materials, such as aliphatic, alicyclic, terpene and aromatic hydrocarbons, fatty acids, and the like, but solvent extraction and like methods may be employed, either before and/or after the removal of the non-saponifiables from the corresponding soaps. One method involves the solution of the mixture of fatty acid esters and rosin acids in a solvent such as ether and the extraction of the rosin acids therefrom with an aqueous alkaline solution.

It should also be noted that, although it is preferred to flash into the flash chamber, in some instances it may be desirable to flash the acids directly into the fractionating tower. The process may be conducted in a continuous manner, or it may be carried out in a batch procedure.

The invention will be further illustrated by the following specific examples, although it is not limited thereto.

*Example 1*

1000 parts of a distilled liquid resin are introduced into a suitable closed vessel provided with a steam inlet, a stirrer, a thermometer and an outlet leading to a condenser and receiving vessel. The material is heated, and, during the heating, 170 parts of soda ash are added at a rate such that excessive foaming is avoided. The rate of heating and of addition of soda ash is such that, when all of the soda ash has been added, the temperature of the mass is somewhat above 200° C. At no time is the addition of the soda ash sufficiently rapid to permit the material which is being heated to solidify or to harden. As soon as the temperature of the material reaches about 100° C., a vigorous current of steam is introduced in order thoroughly to agitate the mass and to exclude air from the vessel. After the soda ash has all been added, the temperature of the mass within the vessel is rapidly raised to from 300 to 310° C. and is maintained at that temperature until measurable amounts of volatile material stop distilling over. This takes about five hours. The injection of a vigorous current of steam is, of course, continued throughout the entire time of heating. 947 parts of saponified, substantially anhydrous material remain in the vessel, and 114 parts of volatile matter are collected in the receiver. The soap or soap-like material remaining in the vessel is almost odorless and, after dissolving in water or in hydrated soap stock, as by introducing the liquid mass under the surface of water or hydrated soap stock to prevent contact with air, and graining out by the usual procedure, is considerably harder than soap obtained from the same product by previously proposed processes.

The soap obtained was split by acidifying with mineral acid to liberate the free acids, which are compared with those of the original material. The original material has an iodine value of about 114.9, whereas the material after treatment has an iodine value of about 89.8. The fatty acids present are methylated in the presence of sulphuric acid, and the methyl esters of the fatty acids are separated from the resin-like acids by fractional distillation. They have an iodine value of about 71.08, whereas fatty acid esters similarly obtained from the original material have an iodine value of about 94.04. The resin-like acids, obtained after separation of the methyl esters of the fatty acids from the treated product, have an iodine value of about 92.07, and those from the original material an iodine value of about 102.78. The unsaponifiable material separated from the original liquid resin soap by extraction with ethyl ether has an iodine value of about 170.3, and that obtained in the condenser and receiver has an iodine value of about 121.4. The fatty acid esters obtained in separation of the fatty acids and the resin-like acids from the original material have an acetyl value of about 13.01, whereas the fatty acid esters obtained from the treated material have an acetyl value of about 7.38, indicating a desirable decrease in the hydroxyl content, or reactivity with acetic anhydride. The unsaponifiables extracted from the original material have an acetyl value of about 19.2, whereas the unsaponifiable distillate has an acetyl value of about 40.5. The acid and saponification values of the materials are not substantially changed.

*Example II*

2000 parts of "crude soap" are completely saponified with approximately 35 parts of 50° Bé. aqueous caustic soda solution. After boiling with air blowing for several hours, the soap solution is grained out by addition of sodium chloride brine. Enough salt is added so that no nigre formation occurs. The salted-out soap is settled over night in the steam bath, and the soap is separated from the lye by filtration.

The soap is thinned with water, agitated with air, and again salted out at boiling temperature and settled for several hours. After separation of lye #2, the process of redissolving and salting out is repeated once more, resulting in separation of lye #3. The soaps are split by acidifying with an inorganic acid, and the resulting acids are washed free of inorganic salts.

810 parts of these tall oil acids are fractionated at 5 mm. in a fractionating column having a heated jacket and a reflux ratio of approximately 3:1. The products are obtained in twenty fractions and a residue. The first fraction distilling below 190° C. is 5 parts of a brown oily liquid. The next two fractions distilling between about 190 and 205° C. at 5 mm. comprise about 17 parts of fatty acid material containing an appreciable quantity of unsaponifiable material. The next eight fractions, distilling between about 205° and 210° C. at 5 mm., comprise about 291 parts of liquid fatty acid material containing a minor amount of unsaponifiables. The next three fractions, distilling at 5 mm. between about 211° and about 230° C., comprise about 63 parts of an intermediate fraction, which may be refractionated to give further separation. The final six fractions, distilling between about 231° C. and 236° C. at 5 mm., comprise about 256 parts of resinous material. This resinous material is then redistilled to obtain a material of lighter color. Of course, the presence of unsaponifiable constituents, having a boiling range of about 120 to about 320° C. at 3 mm., prevents the formation of any really pure fractions by the above distillation. A residue of 176 parts of tacky material, suitable for binding and adhesive purposes, is obtained.

The two groups of fatty acid fractions are each then submitted to the alkali-steam treatment, as outlined in Example I, to obtain fractions of fatty acids substantially free from unsaponifiable constituents. These fractions may be further fractionally distilled to obtain even purer products. The fatty acids fractions, with or without fractional distillation, are then taken up in acetone and fractionally crystallized therefrom to obtain relatively pure fractions of the individual fatty acids, namely, stearic acid, palmitic acid, oleic acid, linoleic acid, and linolenic acid.

*Example III*

2000 parts of distilled tall oil are introduced into a suitable closed container provided with a steam inlet, a stirrer, a thermometer and an outlet leading to a condenser and a receiving vessel. The material is heated to about 200° C. and, during the heating, 370 parts of soda ash are slowly added. A current of steam is continuously introduced to displace the air in the container and to agitate the mass.

The temperature of the mass is then slowly raised to about 250° C., at which temperature it is held for about an hour. 119 parts of volatile unsaponifiable matter are collected in the receiving vessel. The liquid soap material remaining in the vessel is introduced below the surface of water, acidified to split out the acids, and washed with water to remove the inorganic salts. 1752 parts of the acids are then fractionated at 5 mm. pressure in a jacketed fractionating column having a reflux ratio of 2:1. The material is taken off in 17 fractions, leaving a residue of 458 parts of resinous material. The second to sixth fractions, inclusive, having a distillation range of 179–206° C. at 5 mm., are refractionated in the same column, after cleaning. The seventh to eleventh fractions, inclusive, having a distillation range of about 206–208° C. at 5 mm., are then immediately refractionated in the same column. Finally the twelfth through sixteenth fractions, having a distillation range of about 209–222° C. at 5 mm., are then refractionated in the same column. Fractions having overlapping boiling ranges from each of these three distillations are combined. 15 fractions and a residue of 92 parts are obtained. 5 fractions are 237 parts of solid fatty acid, having a boiling range between about 150 and 200° C. at 5 mm., and 10 fractions are 818 parts of liquid fatty acids, having a distillation range of about 200–214° C. at 5 mm.

Instead of alkali-steam treating the liquid rosin (that is, the undistilled or distilled liquid rosin) in acid form, it may be used in saponified form, in which case care must be taken during the initial stages of the heating to prevent local overheating and decomposition at the surfaces of contact between the the vessel and the product. An advantageous way to carry out the treatment, starting with the saponified material, is to maintain a body of some of material at the relatively high temperature of 200 to 350° C., where it is thinly fluid, to add the rest of the material at a rate not substantially greater than the rate at which it may be heated to the temperature necessary for fluidity, and to operate the process with continuous or successive additions of crude material and withdrawals of treated material.

If the lower temperatures, in the neighborhood of 200 to 250° C., are used for the alkali-steam treatment, a longer time of treatment is generally required to provide the substantially complete separation of the unsaponifiable constituents. The time required for this separation will vary with the temperature of the treatment, the pressure maintained within the vessel, and the amount of steam used. It will also vary somewhat with the particular liquid resin treated, as some liquid resins contain more unsaponifiable material or less volatile unsaponifiable material, than other liquid resins. In general, the rapidity of separation of unsaponifiable material is greater at higher temperatures, at higher vacua, and with injection of greater quantities of steam. Another factor which influences the selection of proper periods and temperatures for treatment is that the desirable changes in the characteristics of the various products, for example, the lowering of the iodine values of the resin and fatty acids and of the unsaponifiable material, are more rapid and greater at higher temperatures, for example, 300–325° C., than at lower temperatures, for example, 225–250° C. In general, temperatures of 250 to 300° C. are preferred. In some cases, temperatures in excess of 350° C. may be used, but it is advantageous to avoid the use of such high temperatures because of the danger of decomposition.

Various alkaline materials may be used for the saponification, including caustic alkalies (caustic soda or potash), lime, carbonated alkalies (soda ash or potassium carbonate), limestone, marble dust, magnesium carbonate, dolomite, etc., or mixtures thereof. Soda ash is preferred because it is cheap and effective and because it produces a directly usable sodium soap. It may be necessary to change the temperatures employed if alkaline materials other than caustic soda or soda ash are used, because of the differences in the melting points of the soaps formed with metals other than sodium. In any event, the temperature must be sufficiently high to insure the necessary fluidity.

It is possible to add other organic acid materials to the liquid resin at any point during the process. For example, various oils, fats, waxes and resins may be added to the tall oil or crude resin, before any processing has been effected, to remove various impurities which they may contain. Suitable addition agents are wool fat, certain grades of garbage grease, whale oil and fish oils, spermaceti, tallow, coconut oil, olive oil, various grades of wood and gum rosin, cottonseed oil, linseed oil, chinawood oil, soya bean oil, palm oil, montan wax, carnauba wax, Japan wax, and Chinese wax, as well as the various individual fatty or resin acids thereof or mixtures of any of these fats, oils, waxes, resins and acids.

The new soap compositions and/or the oxygen-containing inorganic acid derivatives of the unsaponifiables may be used in combination with any of the common auxiliary agents used in soap and detergent compositions. Suitable addition agents are other emulsifying agents, including long-chain alcohol sulphate salts, monoglyceride monosulphate salts, salts of sulphonated mineral oil extracts, turkey red oil, lecithin, and ethanolamine soaps; alkaline soap builders, such as borax, soda ash, trisodium phosphate, and sodium silicate; the water-soluble, water-softening phosphorous compounds of the type of tetraphosphoric, pyrophosphoric or hexametaphosphoric acid and their alkali metal, ammonium, and certain amine salts or alkyl esters; methyl and ethyl cellulose; coloring matter, such as dyes, lakes, and pigments; abrasives and fillers, such as silica, pumice, feldspar, precipitated chalk, infusorial earth, bentonite, talc, starch, and air; liquids, including carbon tetrachloride, perchlorethylene, trichlorethylene, glycerine, ethyl alcohol, glycol, tetrahydrofurfuryl alcohol, phenol, cyclohexanol, water, tetralin, decalin, pine oil, mineral oil, mineral oil extracts, and naphtha; perfumes and deodorants; fats, oils, fatty acids, monoglycerides, waxes, gums, glue and resins; germicides, such as phenol and organic or inorganic mercury compounds; any of the common water-soluble alkali metal or ammonium salts, and various mixtures thereof. The type of addition agent to be used will depend, of course, upon the ultimate use of the new soap composition. The various ingredients may be mixed with the soap by any of the common methods such as milling, stirring, kneading, crutching, fusing, and forming mixed solutions. The hot anhydrous soap is advantageously added to a hydrated soap in order to dissolve it more readily. The hydrated soap may also contain other addition agents before the anhydrous soap is added. The hot anhydrous soap may be mixed with steam and sprayed directly to form a hydrated soap powder, with or without the addition agents.

Where, in this specification and the appended claims, reference is made to liquid resin, it is understood that it refers to that product which is obtained as a by-product from the processing of wood to produce paper pulp, which product consists of a mixture of resin-like acids, fatty acids, unsaponifiable material and impurities, whether produced by the sulphate, sulphite, soda or other processes, and whether distilled or not; and where reference is made to saponified liquid resin, it is understood that it is to such a product in saponified form, whether obtained by saponifying liquid resin or obtained in the crude form by directly separating it from the liquors of the paper making process without acidification to produce the liquid resin.

It will thus be seen that, by the present invention, there is provided a process for the production of soaps and soap-like detergents, as well as non-acid material adapted for the production of sulphonated detergents, of commercially satisfactory qualities from the by-products of the alkaline processes for the production of paper pulp. This invention also provides, as new products, these improved soaps or soap-like detergents and improved unsaponifiable products.

This application is a continuation in part of the applicant's copending United States application Serial No. 225,083, filed August 16, 1938.

As many widely different embodiments of the invention may be made without departing from the spirit and scope thereof, it is to be understood that the application is not limited to the specific proportions or embodiments thereof, except as defined in the following claims.

I claim:

1. The process which comprises subjecting substantially completely saponified tall oil in a substantially anhydrous state to a temperature between about 200° to 350° C. but above the melting point of the substantially anhydrous soap, while passing a current of steam through it for a period of time sufficient to effect substantial removal of unsaponifiable material.

2. The process which comprises heating tall oil while passing a strong current of steam through it, gradually adding, during such heating, an alkaline material to form soaps with the resin-like and fatty acids, the rate of addition of such alkaline material being such that the product is maintained in a fluid state, the amount of alkaline material added being such as to substantially completely saponify the resin-like and fatty acids, continuing such heating and passage of steam after the addition of the alkaline material for a period of time sufficient to vaporize substantially all liquid water and unsaponifiable material in the tall oil while maintaining the temperature of the mass from about 200° to about 350° C. and above the melting point of the soap at all times, and separately condensing and collecting the unsaponifiable material vaporized from the saponified mass.

3. The process as in claim 2, in which the alkaline material is soda ash.

4. The process which comprises heating tall oil with sufficient alkaline material to neutralize substantially all the carboxylic acids therein, in an inert atmosphere and in the substantial absence of air and liquid water, to a temperature above the melting point of the resulting substantially anhydrous soap, while passing an inert gas therethrough whereby volatile, non-saponified materials are vaporized.

5. The process which comprises heating, in an inert atmosphere and in the substantial absence of air and liquid water, a tall oil with sufficient alkaline material to neutralize substantially all the carboxylic acids therein, to a temperature below 350° C. but not lower than the melting point of the corresponding substantially anhydrous soap, while passing an inert gas therethrough whereby volatile, non-saponified materials are vaporized.

6. The process which comprises heating a substantially completely saponified tall oil in an inert atmosphere and under reduced pressure to a temperature not lower than the melting point of the resulting substantially anhydrous tall oil soap, while vigorously agitating the fluid soap with an inert gas whereby the volatile, non-saponifiable materials and any liquid water are substantially removed therefrom.

7. The process which comprises heating a substantially completely saponified tall oil in a substantially anhydrous condition in an inert atmosphere at a temperature not lower than the melting point of the substantially anhydrous tall oil soap, while vigorously agitating the fluid anhydrous soap with an inert gas in order to remove the volatile, non-saponifiable materials therefrom.

8. The process which comprises blowing a caustic alkaline tall oil soap mixture with a gas, salting out the soap from said mixture, heating the substantially completely saponified tall oil in a substantially anhydrous state in an inert atmosphere at a temperature not lower than the melting point of the corresponding substantially anhydrous soap, while passing an inert gas therethrough whereby the volatile, non-saponifiable materials are separated therefrom.

9. The process which comprises heating substantially completely saponified tall oil in a substantially anhydrous state at a temperature between 300° and 350° C. but not lower than the melting point of the substantially anhydrous soap, while thoroughly agitating the mixture in an inert atmosphere by intimately contacting the mixture with a stream of inert gas thereby removing non-saponified material, and then acidifying to obtain a purified tall oil.

10. The process which comprises blowing a caustic alkaline aqueous tall oil soap mixture with a gas, salting out the soap from said mixture, acidifying said soap to obtain the acids thereof, heating the acids with sufficient alkaline material to neutralize substantially all the carboxylic acids therein, to a temperature below 350° C. but not lower than the melting point of the corresponding substantially anhydrous soap and thoroughly agitating the mixture in an atmosphere free of oxygen, while intimately contacting the mixture with a stream of water vapor thereby removing non-saponified material and any liquid water from the resulting substantially anhydrous soap.

11. The process which comprises heating a tall oil with sufficient alkaline material to neutralize substantially all of the carboxylic acids therein to a temperature not lower than the melting point of the corresponding substantially anhydrous salt and thoroughly agitating the mixture in an inert atmosphere by intimately contacting the mixture with a stream of water vapor thereby removing non-saponified material and any liquid water from the resulting substantially anhydrous soap.

EMIL EDWARD DREGER.